(12) United States Patent
Müller

(10) Patent No.: US 8,375,707 B2
(45) Date of Patent: Feb. 19, 2013

(54) EXHAUST GAS COLLECTOR

(75) Inventor: Frank Müller, Esslingen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 765 days.

(21) Appl. No.: 12/337,175

(22) Filed: Dec. 17, 2008

(65) Prior Publication Data

US 2009/0158724 A1 Jun. 25, 2009

(30) Foreign Application Priority Data

Dec. 24, 2007 (DE) .......................... 10 2007 062 661

(51) Int. Cl.
*F01N 1/00* (2006.01)
(52) U.S. Cl. ........................................... 60/323; 60/324
(58) Field of Classification Search .................... 60/323, 60/324
See application file for complete search history.

(56) References Cited

U.S. PATENT DOCUMENTS

| | | |
|---|---|---|
| 4,179,884 A | 12/1979 | Koeslin |
| 4,897,908 A | 2/1990 | Henriksson |
| 5,018,272 A | 5/1991 | Seeger et al. |
| 5,100,047 A | 3/1992 | Nakagawa et al. |
| 5,390,494 A | 2/1995 | Clegg |
| 5,713,611 A | 2/1998 | Kurimoto et al. |
| 5,799,395 A | 9/1998 | Nording et al. |
| 5,907,134 A | 5/1999 | Nording et al. |
| 6,223,434 B1 | 5/2001 | Morikawa |
| 6,247,552 B1 | 6/2001 | Kovar et al. |
| 6,343,417 B1 | 2/2002 | Bonny et al. |
| 6,555,070 B1 | 4/2003 | Krüger |
| 6,654,995 B1 | 12/2003 | Wang et al. |
| 6,702,062 B2* | 3/2004 | Kusabiraki et al. ........... 181/240 |
| 7,127,816 B2 | 10/2006 | Kiehl |
| 7,252,177 B2* | 8/2007 | Minato ......................... 181/240 |
| 2002/0174650 A1* | 11/2002 | Durr et al. ....................... 60/323 |
| 2004/0099242 A1* | 5/2004 | Wu et al. ..................... 123/198 F |
| 2005/0072143 A1* | 4/2005 | Diez ................................ 60/321 |

(Continued)

FOREIGN PATENT DOCUMENTS

DE 32 16980 A1 10/1983
DE 4437380 A1 7/1995
(Continued)

OTHER PUBLICATIONS

English translation of Japanese Patent Application Publication No. JP 63-215809A.*

*Primary Examiner* — Thomas Denion
*Assistant Examiner* — Jason Shanske
(74) *Attorney, Agent, or Firm* — Reinhart Boerner Van Deuren P.C.

(57) ABSTRACT

The present invention relates to an exhaust gas collector for an exhaust system of an internal combustion engine, in particular in a motor vehicle, having two internal shell bodies which each connect a plurality of inlet openings in a communicating fashion to an outlet opening, having an external shell body which encloses a receptacle space in which the two internal shell bodies are at least partially arranged. In order to improve the response behavior of a turbocharger, which can be connected to the exhaust gas collector, a dividing wall is proposed which divides the receptacle space into two partial spaces, one of the two internal shell bodies being at least partially arranged in each of the partial spaces.

19 Claims, 7 Drawing Sheets

U.S. PATENT DOCUMENTS

| | | | |
|---|---|---|---|
| 2005/0086936 A1* | 4/2005 | Bucknell et al. | 60/602 |
| 2005/0115231 A1* | 6/2005 | Ashida et al. | 60/313 |
| 2005/0183414 A1* | 8/2005 | Bien et al. | 60/323 |
| 2009/0158588 A1 | 6/2009 | Nording | |

FOREIGN PATENT DOCUMENTS

| | | |
|---|---|---|
| DE | 101 12 707 C1 | 6/2002 |
| DE | 10 2005 002 250 A1 | 7/2006 |
| EP | 0695901 A1 | 2/1996 |
| EP | 0919703 A2 | 6/1999 |
| EP | 0928885 A2 | 7/1999 |
| EP | 0992659 A2 | 4/2000 |
| EP | 1 225 314 A2 | 7/2002 |
| EP | 1 291 500 A2 | 3/2003 |
| EP | 0 664 385 B1 | 4/2003 |
| EP | 1522687 A2 | 4/2005 |
| EP | 1 225 314 B1 | 5/2006 |
| JP | 63215809 A * | 9/1988 |
| JP | 02055823 A * | 2/1990 |

* cited by examiner

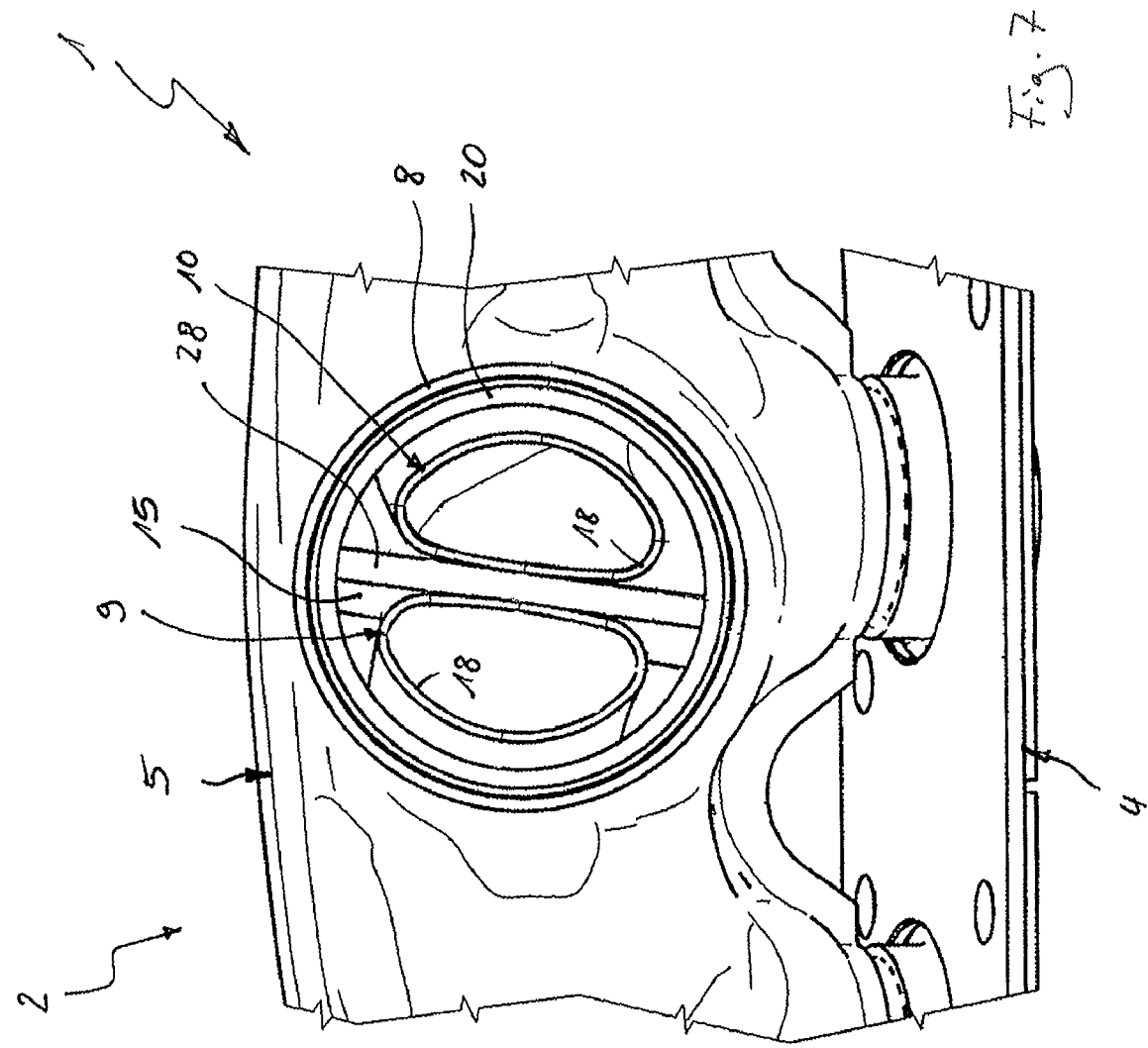

EXHAUST GAS COLLECTOR

CROSS-REFERENCE TO RELATED PATENT APPLICATIONS

This patent application claims the benefit of co-pending German Patent Application No. DE 102007062661.6, filed Dec. 24, 2007, the entire teachings and disclosure of which are incorporated herein by reference thereto.

FIELD OF THE INVENTION

The present invention relates to an exhaust gas collector for an internal combustion engine, in particular in a motor vehicle. The invention also relates to an exhaust system which is equipped with such an exhaust gas collector.

BACKGROUND OF THE INVENTION

In an internal combustion engine, an exhaust gas collector serves to collect the exhaust gas which exits the individual cylinders of an engine block, in particular from a cylinder head, of the internal combustion engine, in order to feed said exhaust gas to a common exhaust gas pipe. For this purpose, such an exhaust gas collector is connected by flanges directly to the cylinder head. To this extent, such an exhaust gas collector, which can also be referred to as an exhaust gas manifold, forms the inlet region of an exhaust train of an exhaust system.

In internal combustion engines which generate relatively high exhaust temperatures during operation, it is possible to use exhaust gas collectors which have air gap insulation and in which an external shell body encloses at least an inner shell body so as to form a thermally insulating air gap.

In addition, modern internal combustion engines can be equipped with an exhaust gas turbocharger in order to enhance their performance. The turbine-end inlet of such an exhaust gas turbocharger can be connected directly by flanges to the exhaust gas collector. In such types of engine, what are referred to as twin scroll exhaust gas turbochargers can be used, said turbochargers being distinguished by the fact that two separate inlet paths lead from the exhaust-gas-end inlet to a common turbine wheel of the exhaust gas turbocharger. The response behavior in such a twin scroll turbocharger can be improved by selectively dividing the exhaust gas streams, which occur cyclically at the individual cylinders, between the two inlet paths.

BRIEF SUMMARY OF THE INVENTION

Embodiments of the present invention are concerned with the problem of specifying an improved embodiment for an exhaust gas collector or for an exhaust system which is equipped therewith and which is distinguished in particular by the fact that if the exhaust gas collector is used together with the turbocharger, in particular with a twin scroll turbocharger, improved supercharging of the internal combustion engine which is equipped therewith, in particular in the form of an improved response behavior, is made possible.

Embodiments of the invention are based on the general idea that, in an exhaust gas collector which has, in a common external shell body, a receptacle space for holding two separate internal shell bodies, the receptacle space is divided, using a dividing wall, into two partial spaces which each hold one of the internal shell bodies. The dividing wall brings about relatively effective decoupling of the two partial spaces in terms of pressure pulsations. For this purpose, the dividing wall, for example a sheet-metal shaped part, is arranged in the external shell body in such a way that it divides the two partial spaces from one another in a more or less gastight fashion, or at least impedes the exchange of gases between the two partial spaces. It has become apparent that the formation of the partial spaces in the external shell body reduces the interactions between the flows of gas, which are per se independent, in the two internal shell bodies. Such interactions can occur due to leakages, as a result of which exhaust gas passes from one of the internal shell bodies into the external shell body and via the latter into the other internal shell body and/or to the outlet side of the exhaust gas collector. The dividing wall in the external shell body can therefore improve the separated guidance of exhaust gas to the inlet of the turbocharger which is connected by flanges directly to the exhaust gas collector, wherein, in particular in the case of a twin scroll exhaust gas turbocharger, a significant improvement in the response behavior occurs at low rotational speeds of the internal combustion engine.

The external shell body can have an outlet region for the connection of the exhaust gas turbocharger. The outlet sections of the two internal shell bodies with their outlet openings end in this outlet region. As a result, the internal shell bodies can be connected directly by their outlet openings to the two inlet paths of a twin scroll exhaust gas turbocharger. The dividing wall now extends preferably between these outlet sections as far as into the outlet region. In particular, the dividing wall can interact here with a connecting region of the turbocharger in order to improve the separation of the two partial spaces in terms of the exchange of gas and/or in terms of the transmission of pressure oscillations.

According to a further advantageous embodiment, the dividing wall can extend spaced apart from the two internal shell bodies. To this extent, the dividing wall can implement the principle of air gap insulation.

Further important features and advantages of the invention emerge from the claims, from the drawings and from the associated description of the figures with reference to the drawings.

Of course, the features which are mentioned above and which will be explained below can be used not only in the respectively specified combination but also in other combinations or in isolation without departing from the scope of the present invention.

Other aspects, objectives and advantages of the invention will become more apparent from the following detailed description when taken in conjunction with the accompanying drawings.

BRIEF DESCRIPTION OF THE DRAWINGS

Preferred exemplary embodiments of the invention are illustrated in the drawings and will be explained in more detail in the following description in which identical reference symbols refer to identical or similar or functionally identical components. In said drawings, in each case in a schematic form:

FIG. 7 shows a view corresponding to a viewing direction VII in FIG. 5.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
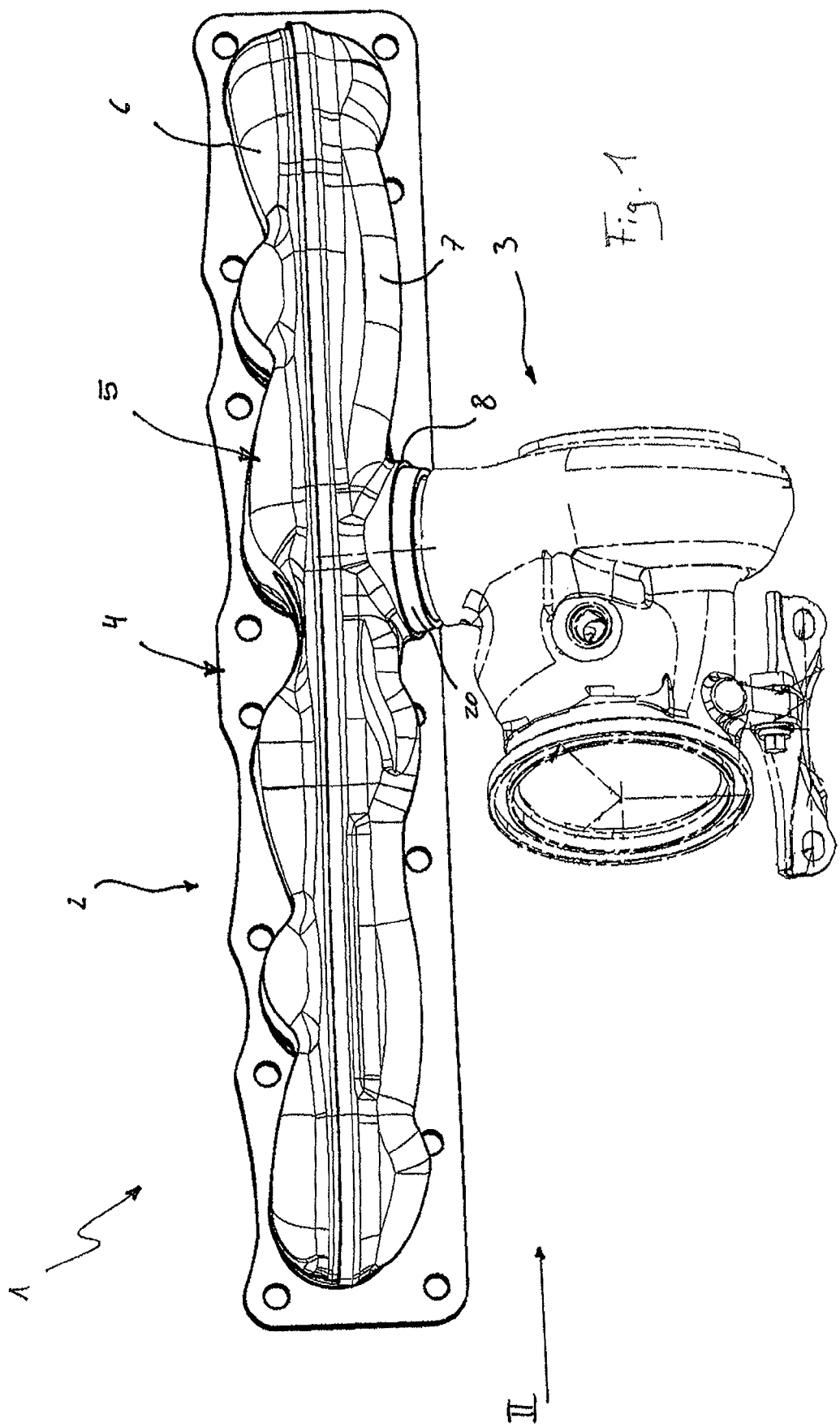
FIG. 1 shows a plan view of an exhaust gas collector.
Figure 2:
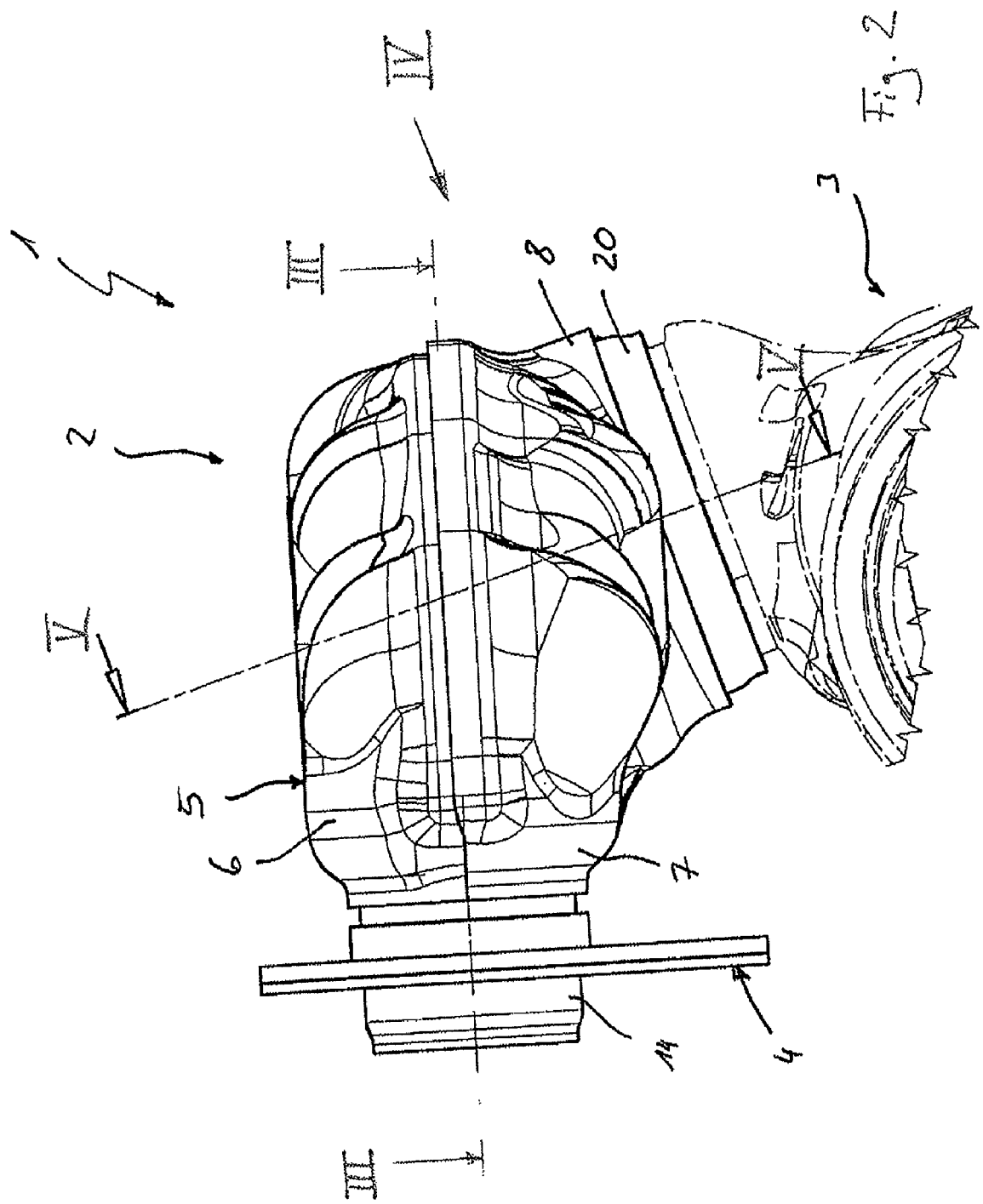
FIG. 2 shows a side view of the exhaust gas collector corresponding to a viewing direction II in FIG. 1.
Figure 3:
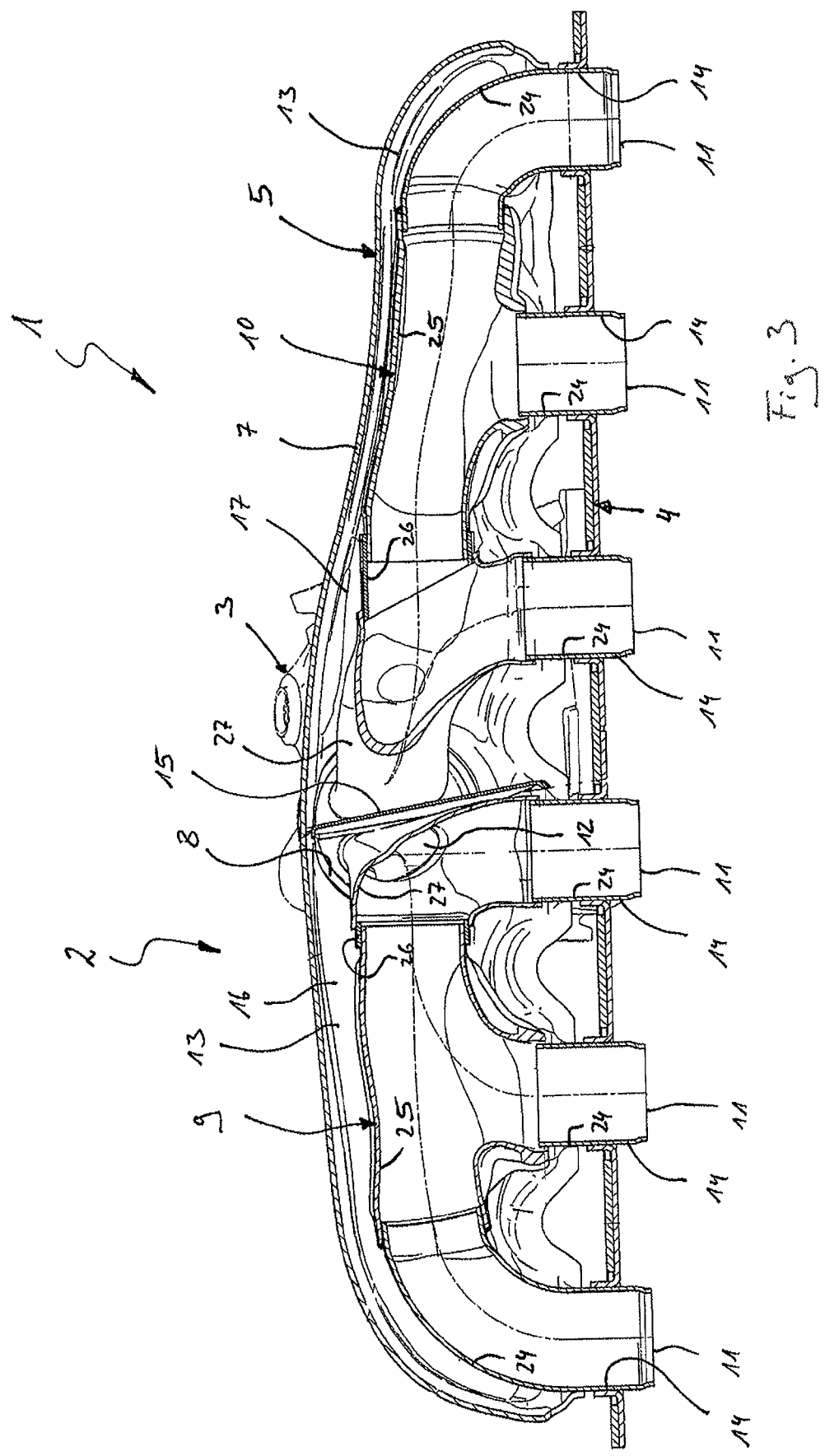
FIG. 3 shows a longitudinal section through the exhaust gas collector corresponding to sectional lines III in FIG. 2.

According to FIGS. 1 to 3, an exhaust system 1, which is illustrated only partially, can have at least an exhaust gas collector 2 and an exhaust gas turbocharger 3, which is illustrated here by continuous lines. The exhaust system 1 serves to conduct away exhaust gases of an internal combustion engine (not illustrated here), which can be arranged, in particular, in a motor vehicle. The exhaust gas collector 2 forms the inlet region of the exhaust system 1 and is provided for mounting on a cylinder head of the internal combustion engine. For this purpose, the exhaust gas collector 2 has a flange 4 with which the exhaust gas collector 2 can be mounted on the cylinder head. The exhaust gas collector 2 has an external shell body 5, which is preferably composed of two external shells 6 and 7. In addition, the external shell body 5 has an outlet region 8 at which the turbocharger 3 is connected to the exhaust gas collector 2.

According to FIG. 3, the exhaust gas collector 2 has two internal shell bodies 9 and 10 which each have a plurality of inlet openings 11 and each have an outlet opening 12. The respective internal shell body 9, 10 provides a communicating connection between its inlet openings 11 and its outlet opening 12. Each inlet opening 11 is assigned to a cylinder of the internal combustion engine. In the example shown, the exhaust gas collector 2 is therefore provided for use on a series mounted six-cylinder engine or on a V12 engine. The embodiment shown does not restrict the generality here. In particular, the exhaust gas collector 2 can therefore also be configured in other embodiments for use in a series mounted four-cylinder engine or in a V8 engine or in a series mounted eight-cylinder engine.

The external shell body 5 surrounds a receptacle space 13 in which the two internal shell bodies 9, 10 are arranged. In the example, the internal shell bodies 9, 10 project out of the receptacle space 13 or out of the external shell body 5 only in the region of inlet sections 14 which each have one of the inlet openings 11. In the example shown, the exhaust gas collector 2 is configured as an exhaust gas collector 2 with air gap insulation. Accordingly, the external shell body 5 encloses the two internal shell bodies 9, 10 in such a way that a thermally insulating air gap can be formed between the external shell body 5 and the two internal shell bodies 9, 10. In the example, the external shell body 5 is supported on the internal shell bodies 9, 10 only in the region of the inlet sections 14.

According to FIGS. 3 to 5 and 7, the exhaust gas collector 2 also has a dividing wall 15 which is arranged in the external shell body 5 in such a way that it divides the receptacle space 13 into two partial spaces 16, 17. The dividing wall 15 extends here between the two internal shell bodies 9, 10 in such a way that in each case one of the two internal shell bodies 9, 10 is held in each of the two partial spaces 16, 17. For example, according to FIG. 3, the internal shell body 9 which is illustrated on the left is accommodated in the left-hand partial space 16, while the right-hand internal shell body 10 is arranged in the right-hand partial space 17.

According to FIGS. 4 to 7, the internal shell bodies 9, 10 each have an outlet section 18 which has the outlet opening 12 of the respective internal shell body 9, 10. The outlet sections 18 are shaped here in such a way that they end with the outlet openings 12 in the outlet region 8 of the external shell body 5. It can be seen that the dividing wall 15 now extends between these outlet sections 18 as far as into the outlet region 8 of the external shell body 5. The dividing wall 15 is expediently arranged spaced apart from the two internal shell bodies 9, 10 here. As a result, in each case a thermally insulating air gap can be implemented between the dividing wall 15 and the respective internal shell body 9, 10.

The dividing wall 15 is expediently a separate component from the two external shells 6, 7 but it can, for example, be attached to one of the two shells 6, 7, for example by means of a welded connection. As a result, when the exhaust gas collector 2 is assembled, the dividing wall 15 can be attached in advance to one of the external shells 6, 7. When the two external shells 6, 7 are assembled, the dividing wall 15 can then be supported on the respective other shell 6, 7, for example by means of a bent edge region, in particular over a surface, as a result of which a certain sealing effect can be implemented between the two partial spaces 16, 17.

Figure 4:
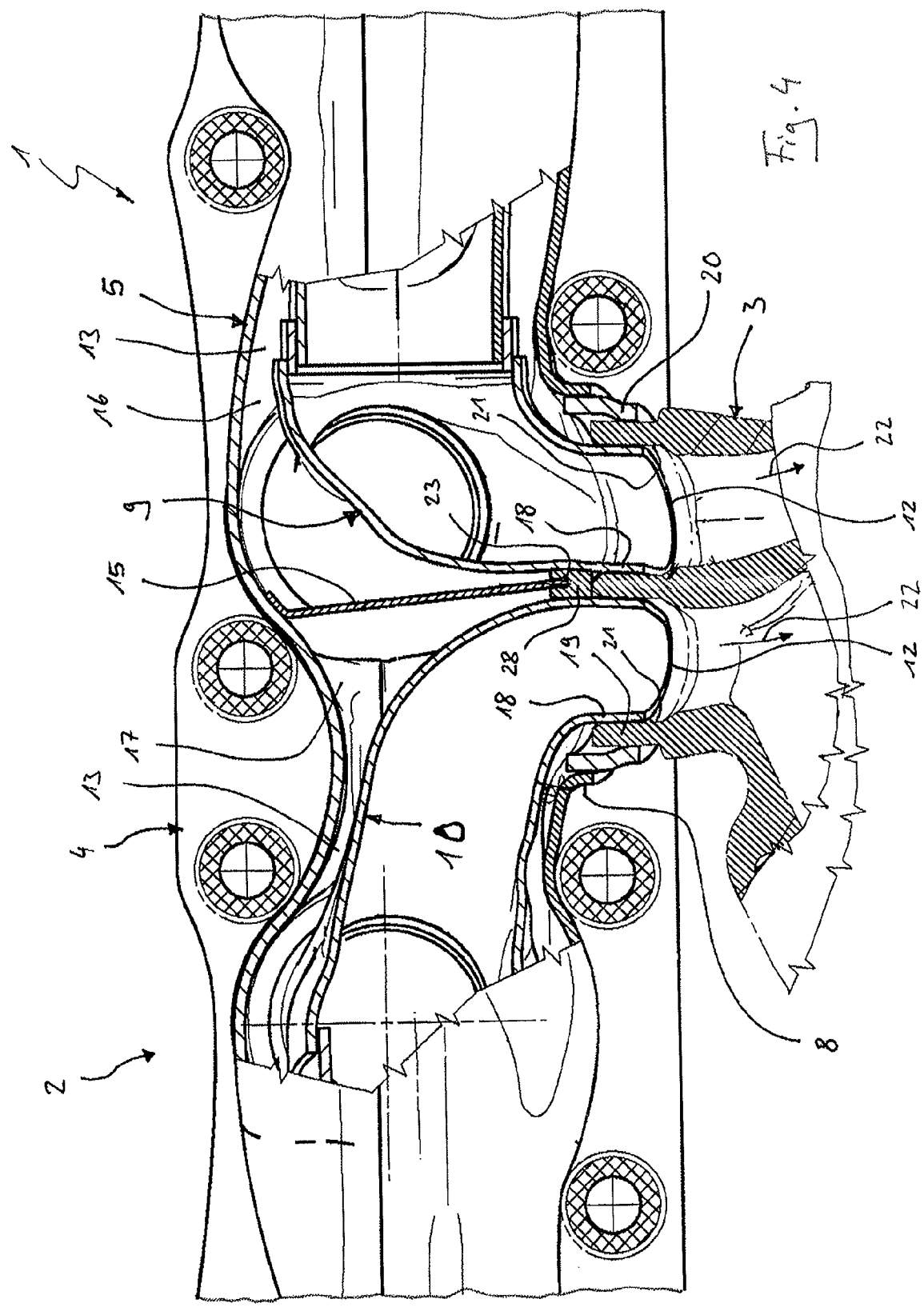
FIG. 4 shows a partially sectional view corresponding to a viewing direction IV in FIG. 2.
Figure 5:
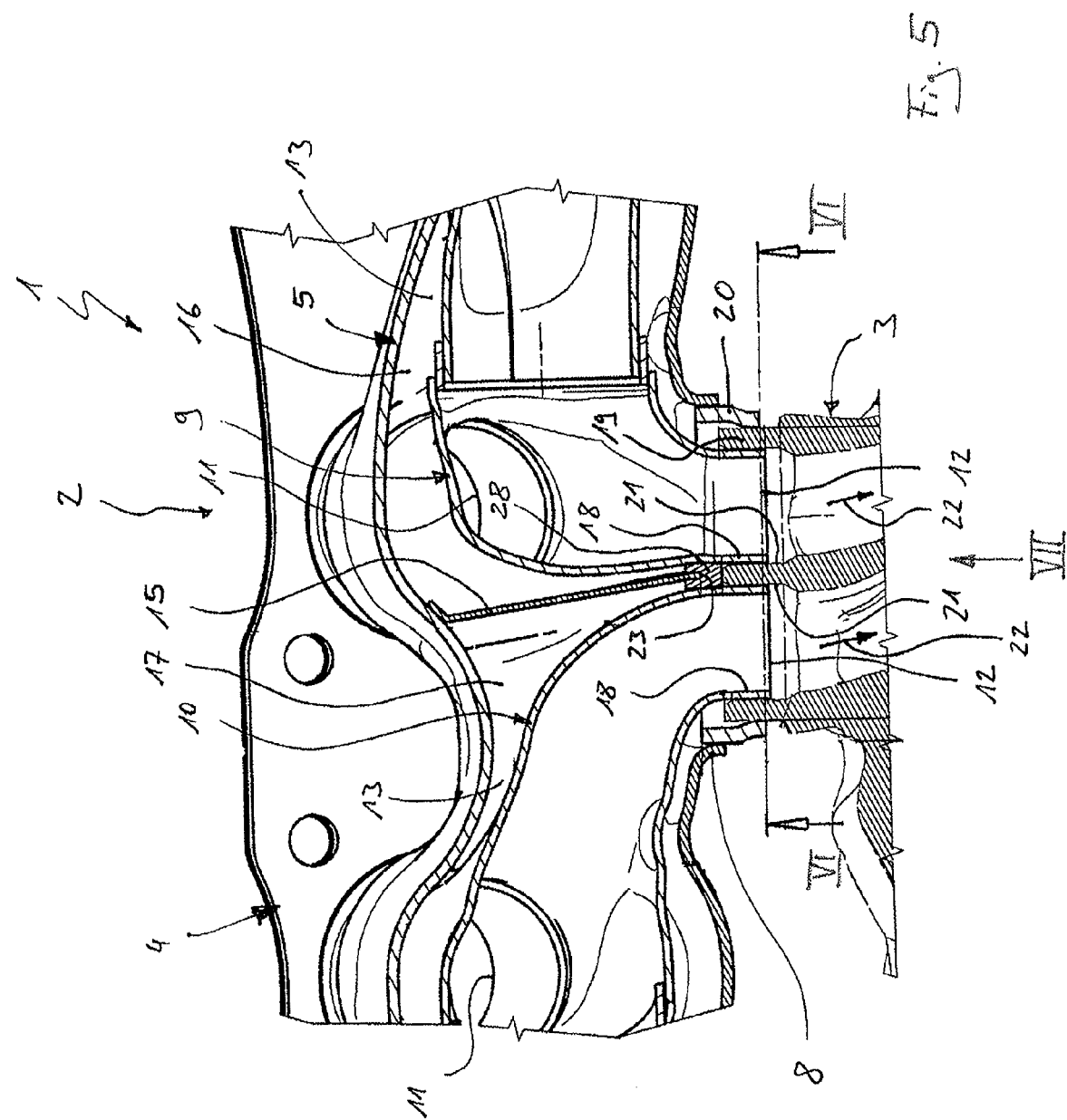
FIG. 5 shows a longitudinal section corresponding to sectional lines V in FIG. 2.
Figure 6:
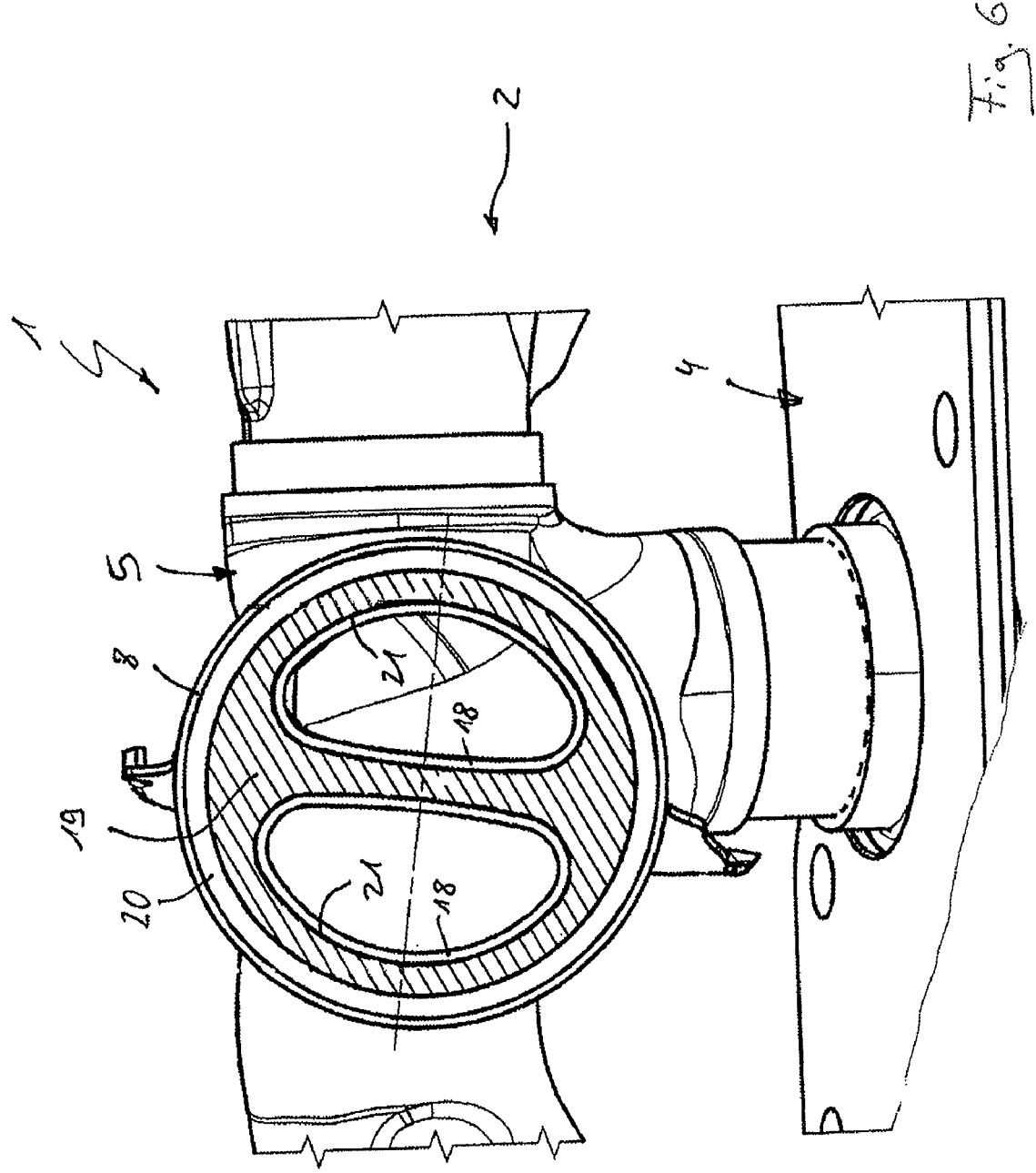
FIG. 6 shows a cross section corresponding to sectional lines VI in FIG. 5.

According to FIGS. 4 to 7, the outlet sections 18 of the two internal shell bodies 9, 10 are preferably configured in such a way that the two outlet openings 12 are arranged one next to the other in the outlet region 8, in which case they can also expediently lie in a common plane; the latter is apparent, for example, from FIG. 5. A direct connection is preferred for the mounting of the exhaust gas turbochargers 3 on the exhaust gas collector 2. For this purpose, an inlet region 19 of the turbocharger 3 is connected directly to the outlet region 8 of the external shell body 5. In this context, as in the exemplary embodiments shown, it is possible to use a connecting element 20 which is configured as an annular body in the examples shown. In the mounted state, the connecting element 20 can, on the one hand, be welded to the outlet region 8 of the external shell body 8 and as a result form a plug-in opening for the inlet region 19 of the turbocharger 3. On the other hand, in the mounted state, the connecting element 20 can be welded to the inlet region 19 of the turbocharger 3. The inlet region 19 of the turbocharger 3 forms two plugging openings 21 for the two outlet sections 18 of the two internal shell bodies 9, 10. The plug-in regions 21 form here at the same time inlet openings of the turbocharger 3. In the mounted state, the two outlet sections 18 are therefore plugged into the two plugging openings 21. The plugging openings 21 give rise to the inlet paths 22, which have already been mentioned above, are indicated here by arrows and lead separately to a turbine (not shown here) of the turbocharger 3. The two exhaust gas streams which are guided separately to this point join only at the turbine or at the respective turbine wheel.

In the embodiment shown here, the dividing wall 15 is additionally supported on the inlet region 19 of the turbocharger 3. In particular, a receptacle groove 23, into which a free end edge of the dividing wall 15 is plugged, is formed here at the inlet region 19. This stabilizes the dividing wall 15 in the mounted state. At the same time, this allows the sealing effect of the dividing wall 15 to be improved.

The receptacle groove 23 can be formed here directly into the end side of the inlet region 19 of the turbocharger 3. It is likewise possible, as indicated in FIGS. 4 and 5, to form the receptacle groove 23 in a separate web 28 on which the two outlet sections 18 are supported, see also FIG. 7. In the mounted state, the web 28 is supported at the end side on the inlet region 19 of the turbocharger 3 and can therefore limit, for example, the plugging in depth of the inlet region 19 with respect to the outlet region 8. This web 28 can be manufactured separately from the inlet region 19 here. The web 28 can be used in particular as a tolerance compensation element in order to simplify the positioning of the turbocharger 3 with respect to the exhaust gas collector 1. In particular, said web 28 is already present when the exhaust gas collector 2 is mounted, as is apparent, for example, from FIG. 7. The view of the outlet region 8 which is shown there occurs when the turbocharger 3 is absent.

In the embodiment shown here, the two internal shell bodies 9, 10 are permanently connected in the region of their inlet sections 14 to the flange 4, in particular welded. The external shell body 5 can likewise be connected directly to the flange 4, for example by means of corresponding welding seams. The external shell body 5 is permanently connected, in particular welded, in the region of the inlet sections 14, to the internal shell bodies 9, 10. The connection to the flange 4 can also be made there. In addition, when the turbocharger 3 is mounted, the external shell body 5 can be supported on the outlet sections 18 of the internal shell bodies 9, 10 in an indirect fashion in the region of the turbocharger's outlet region 8, specifically by means of the connecting element 20 and by means of the inlet region 19 of the turbocharger 3. An embodiment in which the external shell body 5 is permanently connected to the flange 4 is basically also conceivable. Likewise, the external shell body 5 can be permanently connected to the internal shell bodies 9, 10 in the region of the outlet sections 18.

As is apparent in particular from FIG. 1, the two internal shell bodies 9, 10 can be configured in a plurality of components. For example, the two internal shell bodies 9, 10 each comprise, as individual components, three inlet pipes 24 which each form one of the inlet sections 14. In addition, each internal shell body 9, 10 has a connecting pipe 25 which connects the first and the second inlet pipes 24 to an outlet pipe 27 via a coupling pipe 26. The respective outlet pipe 27 connects the third inlet pipe 24 and the connecting pipe 25 to the respective outlet section 18. At least two of these components 24, 25, 26, 27 are mounted in such a way that they can move one against the other by means of a sliding fit (not denoted in more detail). As a result, thermally induced expansion effects in the structure of the internal shell bodies 9, 10 can be absorbed. These sliding fit arrangements can cause leakages which can allow exhaust gas to pass from the interior of the respective internal shell body 9, 10 into the respective partial spaces 16, 17. At the same time pressure pulsations of the exhaust gas streams can also propagate, in particular via the sliding fit arrangements, as far as into the partial spaces 16, 17. The dividing wall 15 reduces or prevents a communicating connection between the two partial spaces 16, 17. Accordingly, the two partial spaces 16, 17 are separated from one another in a more or less gastight fashion by the dividing wall 15. In particular, the dividing wall 15 reduces interactions owing to pressure pulsations between the exhaust gas of the one internal shell body 9 and the exhaust gas of the other internal shell body 10. If the turbocharger 3 which is connected to the exhaust gas collector 2 is configured as a twin scroll turbocharger, the separation of the gas streams up to the turbine can be improved, which permits the response behavior of the turbocharger 3 to be improved.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An exhaust gas collector for an exhaust system of an internal combustion engine, in particular in a motor vehicle, comprising:
    two internal shell bodies which each connect a plurality of inlet openings in a communicating fashion to an outlet opening;
    an external shell body which surrounds a receptacle space in which the two internal shell bodies are at least partially arranged;
    a dividing wall attached to the external shell body and being a separate component from the external shell body, which divides the receptacle space into two partial spaces; and
    one of the two internal shell bodies being at least partially arranged in each of the partial spaces.

2. The exhaust gas collector of claim 1,
    wherein the external shell body has an outlet region in which outlet sections of the two internal shell bodies end with their outlet openings; and
    wherein the dividing wall extends between the outlet sections, as far as the outlet region.

3. The exhaust gas collector of claim 1, wherein the dividing wall is arranged spaced apart from the internal shell bodies.

4. The exhaust gas collector of claim 1,
    wherein the external shell body is assembled from two external shells; and
    wherein the dividing wall is attached to at least one of the external shells.

5. The exhaust gas collector of claim 1, wherein the exhaust gas collector is provided for mounting on a cylinder bank of a four-cylinder series mounted engine or of a V8 engine or of a six-cylinder series mounted engine or of an eight-cylinder series mounted engine or of a V12 engine.

6. The exhaust gas collector of claim 1, wherein the outlet openings of the two internal shell bodies are arranged one next to the other in an outlet region of the external shell body and lie in one plane.

7. The exhaust gas collector of claim 1, wherein the exhaust gas collector is configured as an exhaust gas collector with air gap insulation.

8. The exhaust gas collector of claim 1,
wherein the inlet openings are each formed on an inlet section of the respective internal shell body; and
wherein the exhaust gas collector has a flange for mounting the exhaust gas collector on the internal combustion engine.

9. The exhaust gas collector of claim 8, wherein the internal shell bodies are permanently connected to the flange in the region of the inlet sections.

10. The exhaust gas collector of claim 8, wherein the external shell body is permanently connected to the internal shell bodies in the region of the inlet sections.

11. The exhaust gas collector of claim 8, wherein the external shell body is permanently connected to the flange in the region of the inlet sections.

12. The exhaust gas collector of claim 8, wherein the external shell body is permanently connected to the internal shell bodies in the region of outlet sections, having the outlet openings, of the internal shell bodies.

13. The exhaust gas collector of claim 1, wherein at least one of the internal shell bodies is configured from a plurality of parts.

14. The exhaust gas collector of claim 1, wherein at least one of the internal shell bodies is configured from a plurality of parts in such a way that at least two components of the respective internal shell body are mounted such that they can move one against the other by means of a sliding fit.

15. An exhaust system for an internal combustion engine, in particular in a motor vehicle:
having a twin scroll exhaust gas turbocharger;
having an exhaust gas collector as claimed in claim 1 which is attached to the exhaust gas turbocharger; and
the two outlet openings of the internal shell bodies being connected in a communicating fashion to two inlet openings of the exhaust gas turbocharger, which inlet openings lead to a turbine of the exhaust gas turbocharger via separate inlet paths.

16. The exhaust gas collector of claim 1, wherein the dividing wall is positioned within the receptacle space to prevent fluid communication between the two partial spaces.

17. The exhaust system of claim 15, wherein the dividing wall of the exhaust gas collector is positioned within the receptacle space to prevent fluid communication between the two partial spaces.

18. An exhaust gas collector for an exhaust system of an internal combustion engine, in particular in a motor vehicle, comprising:
two internal shell bodies which each connect a plurality of inlet openings in a communicating fashion to an outlet opening;
an external shell body which encloses a receptacle space in which the two internal shell bodies are at least partially arranged;
a dividing wall which completely divides the receptacle space into two partial spaces; and
one of the two internal shell bodies being at least partially arranged in each of the partial spaces.

19. An exhaust gas collector for an exhaust system of an internal combustion engine, in particular in a motor vehicle, comprising:
two internal shell bodies which each connect a plurality of inlet openings in a communicating fashion to an outlet opening;
an external shell body which encloses a receptacle space in which the two internal shell bodies are at least partially arranged;
a dividing wall which divides the receptacle space into two partial spaces and is configured so as to prevent fluid communication between the two partial spaces; and
one of the two internal shell bodies being at least partially arranged in each of the partial spaces.

* * * * *